(12) United States Patent
Hollowell, II et al.

(10) Patent No.: US 8,447,895 B2
(45) Date of Patent: May 21, 2013

(54) METHODS AND APPARATUS FOR DECREASING POWER CONSUMPTION AND BUS ACTIVITY

(75) Inventors: J. Rhoads Hollowell, II, Lafayette, CO (US); Barry Twycross, Mountain View, CA (US); Arul Paramasivam, Sunnyvale, CA (US); Fernando Urbina, Colorado Springs, CO (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 12/907,929

(22) Filed: Oct. 19, 2010

(65) Prior Publication Data

US 2012/0096191 A1    Apr. 19, 2012

(51) Int. Cl.
*G06F 3/00* (2006.01)
*G06F 13/12* (2006.01)

(52) U.S. Cl.
USPC ............ 710/18; 710/15; 710/52; 710/56

(58) Field of Classification Search
None
See application file for complete search history.

(56) References Cited

U.S. PATENT DOCUMENTS

| | | | | |
|---|---|---|---|---|
| 6,114,968 A * | 9/2000 | Ramakrishnan et al. | ..... | 340/3.51 |
| 6,353,628 B1 * | 3/2002 | Wallace et al. | ............... | 375/220 |
| 7,027,547 B1 * | 4/2006 | Hwang | ....................... | 375/372 |
| 7,328,309 B2 * | 2/2008 | McNeill, Jr. | .................. | 711/118 |
| 7,533,109 B2 * | 5/2009 | Kootstra et al. | ....................... | 1/1 |
| 2004/0148444 A1 * | 7/2004 | Thomas et al. | .................. | 710/44 |
| 2004/0215645 A1 * | 10/2004 | Redpath | ....................... | 707/100 |
| 2005/0091413 A1 * | 4/2005 | Walbeck et al. | .............. | 709/251 |

\* cited by examiner

*Primary Examiner* — Idriss N Alrobaye
*Assistant Examiner* — David Martinez
(74) *Attorney, Agent, or Firm* — Gazdzinski & Associates, PC (57) ABSTRACT

Methods and apparatus for enhancing efficiency (e.g., reducing power consumption and bus activity) in a data bus. In an exemplary embodiment, methods and apparatus for intelligently trimming (and adding or re-adding) queue heads resident in a host device associated with various client device processes are disclosed. By selectively trimming inactive or dormant queue heads, the host expends less resources and time polling the queue heads during routine operations. Similarly, queue heads which are newly active, or acquired are intelligently added to ensure proper bus operation. Inactive queue heads are brought back into the polling process only when requested, thereby keeping the list of queue heads to be polled or examined as short as possible at all times.

21 Claims, 5 Drawing Sheets

METHODS AND APPARATUS FOR DECREASING POWER CONSUMPTION AND BUS ACTIVITY

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computerized devices, data networks and buses. More particularly, in one exemplary aspect, the present invention is directed to efficiently servicing devices of a data network.

2. Description of Related Technology

In a typical network, software processes running on a host device typically have the responsibility of managing communication between devices. In the exemplary context of serialized bus protocols, specifically the Universal Serial Bus (USB) protocol, the software responsible for much of the management functions running on a typical USB Host is known as the USB Host Controller Driver (HCD). The HCD has the responsibility for managing the workload for a USB Host Controller (HC) hardware chip that is in communication with other USB devices. The HCD manages the workload by creating a listing of so-called Queue Heads (QH), which describes the work to be done for each logical channel or "pipe".

The various logical channels or pipes are organized into one of two different types, depending on the type of data that is to be transferred, and include: (1) stream pipes; and (2) message pipes. Stream data has no USB-defined structure, while message data does. One mandatory message pipe, known as the Default Control Pipe, always exists once a device is powered, in order to provide access to the device's configuration, status, and control information.

Each QH associated with a given pipe is created in a location in memory (e.g., in RAM) which is typically "shared", meaning that it can be accessed either by the HCD executing on the main processor, or by the HC hardware device. As every USB device contains a Default Control Pipe, there is at least one QH for every device attached to the USB (this QH is referred to as the Control Endpoint QH). Most devices have one or more additional QHs within this shared memory space. Accordingly, each QH within a network enables software communication with one or more USB devices.

In an effort to be "fair" to every QH present on the network, the HC will take the time to examine the memory space of each of the QHs in e.g., a round robin fashion, in order to determine if the QH should be serviced. This examination of the memory space is performed even if a particular device is idle, or has nothing to communicate over a given QH. Unfortunately, examining a QH in memory takes time, which can result in missed work opportunities on those QHs which actually are "active". This inefficiency is particularly exacerbated in situations where the number of inactive QHs significantly outnumber the active QHs. Additionally, examining an inactive QH may result in more energy being used than would otherwise be necessary, by preventing the processor from going into lower power states. This is particularly problematic for battery powered central processing units (CPUs).

Accordingly, there exists a need to improve upon the inefficiencies associated with these prior art approaches. What is needed are methods and apparatus for reducing bus activity (i.e., unnecessary activity) in order to preserve power in both the host and the client, and also to free-up available bus bandwidth for useful operations. At the same time, such methods and apparatus ideally should not significantly impede bus performance due to e.g., latencies associated with introducing unnecessary bus operations.

SUMMARY OF THE INVENTION

The present invention satisfies the foregoing needs by providing, inter alia, methods and apparatus for efficiently servicing devices of a data network.

In a first aspect of the invention, a method of managing a plurality of queues of processes is disclosed. In one embodiment, the method includes: monitoring the plurality of queues to determine if any meet a first criterion; and when any of the monitored queues meets the first criterion, trimming that queue or queues from the plurality.

In one variant, the method further includes, after the trimming, monitoring only the untrimmed queues.

In another variant, the monitoring is performed by a controller in a host device, and the processes are associated with one or more client devices in data communication with the host device (e.g., data communications over a wired or wireless link).

In another variant, the wired link includes a high-speed serialized bus protocol.

In yet another variant, the at least one criterion includes an inactivity criterion. The inactivity criterion is for example selected from the group consisting of: (i) no activity during a prescribed period of time since the last monitoring for that queue; and (ii) no activity for a prescribed number of monitoring events for that queue.

In yet a further variant, the method further includes identifying one or more queues from the plurality for monitoring based at least in part on queue type. The queue types may be for example associated with respective device types; e.g., a first queue type is associated with a hub device, and a second queue type associated with a client device.

In a second aspect of the invention, a method of reducing resource consumption when monitoring a data bus is disclosed. In one embodiment, the method includes: monitoring a first set of client processes for activity; identifying one or more of the processes which are inactive; removing the inactive processes from monitoring for at least a period of time; and monitoring only the remaining processes for activity at least until one or more of the removed processes again becomes active.

In a third aspect of the invention, host apparatus is disclosed. In one embodiment, the host apparatus includes: a plurality of interfaces, the interfaces each being adapted to sustain data communications with at least one client device; at least one controller in operative communication with the plurality of interfaces, the at least one controller being configured to: poll data structures associated with each of the interfaces; identify those data structures which do not meet an activity criterion; at least temporarily remove the identified data structures; poll the remaining data structures; and return removed ones of the data structures to being polled when they again become active_

In a fourth aspect of the invention, a data device adapted to trim execution process lists is disclosed.

In a fifth aspect, a method of operating a data device that trims execution process lists is disclosed.

In a sixth aspect of the invention, a client device adapted to communicate with a host device over a serial bus is disclosed.

In a seventh aspect of the invention, a control system is disclosed.

In an eighth sixth aspect of the invention, a state machine for use in trimming execution process lists is disclosed.

In a ninth aspect of the invention, a computer readable apparatus is disclosed. In one embodiment, the apparatus includes a storage medium having at least one computer program adapted for trimming execution process lists disposed thereon.

Other features and advantages of the present invention will immediately be recognized by persons of ordinary skill in the art with reference to the attached drawings and detailed description of exemplary embodiments as given below.

DETAILED DESCRIPTION OF THE INVENTION

Overview

The present invention provides, inter glia, methods and apparatus for efficiently servicing devices of a data network. Various aspects of the present invention decrease resource consumption (e.g., power consumption) and bus activity in a data network, such as over a serial bus. Salient aspects of the present invention include, among others: 1) conservation of electrical power; 2) elimination of extraneous transactions over the bus; and 3) reduced latency for data transactions. For example, invention enabled battery-powered client devices will experience improved battery life, increased bandwidth for useful operations, and provide enhanced "user experience".

In one embodiment, the invention achieves the aforementioned goals by intelligently trimming (and adding or re-adding) queue heads resident in a host device associated with various client device processes. By selectively trimming inactive or dormant queue heads, the host expends less resources and time polling the queue heads during routine operations. Similarly, queue heads which are newly active, or acquired must be intelligently added to ensure proper bus operation. Accordingly, only when activity is requested or incipient are the "inactive" queue heads brought back into the polling process, thereby keeping the list of queue heads to be polled or examined as short as possible at all times.

Moreover, as discussed in greater detail hereinafter, various parameters are considered to ensure optimal trimming. For example, in one variant, queue heads may not be immediately trimmed when it is possible for work to be added to the queue head. In another example, queue heads are allowed to go idle for a short "grace" period before being trimmed. This grace period ensures that queue heads that only experience momentary idling are not trimmed overzealously.

In one exemplary implementation of the invention, the host includes a USB host, and the clients are USB client devices, or USB hub devices coupled to the host via a USB-compliant cable.

DETAILED DESCRIPTION OF EXEMPLARY EMBODIMENTS

Exemplary embodiments of the present invention are now described in detail. While these embodiments are discussed primarily in terms of a serial bus that is compliant with the Universal Serial Bus (USB) standard, it will be recognized by those of ordinary skill that the present invention is not in any way limited to a USB-compliant serial bus. In fact, various other applications and embodiments (whether to other types of serial buses, or otherwise) are also possible in accordance with the invention, and considered to be within the scope thereof.

Moreover, as used herein the term "endpoint" generally refers to the portion of a device that is a source and/or a sink of information in a communication flow between devices, and should in no way be considered limiting; i.e., a client device or other entity may or may not comprise a logical or physical "endpoint" within the network.

Furthermore, while some embodiments are shown in the context of a wired data bus or connection (e.g., a cable), the invention is equally applicable to wireless alternatives or interfaces such as, without limitation, IEEE 802.11 wireless networks, IEEE 802.16 wireless networks, personal area networks (PANs), Bluetooth™, infrared or optical communication links, and the like.

Figure 1:
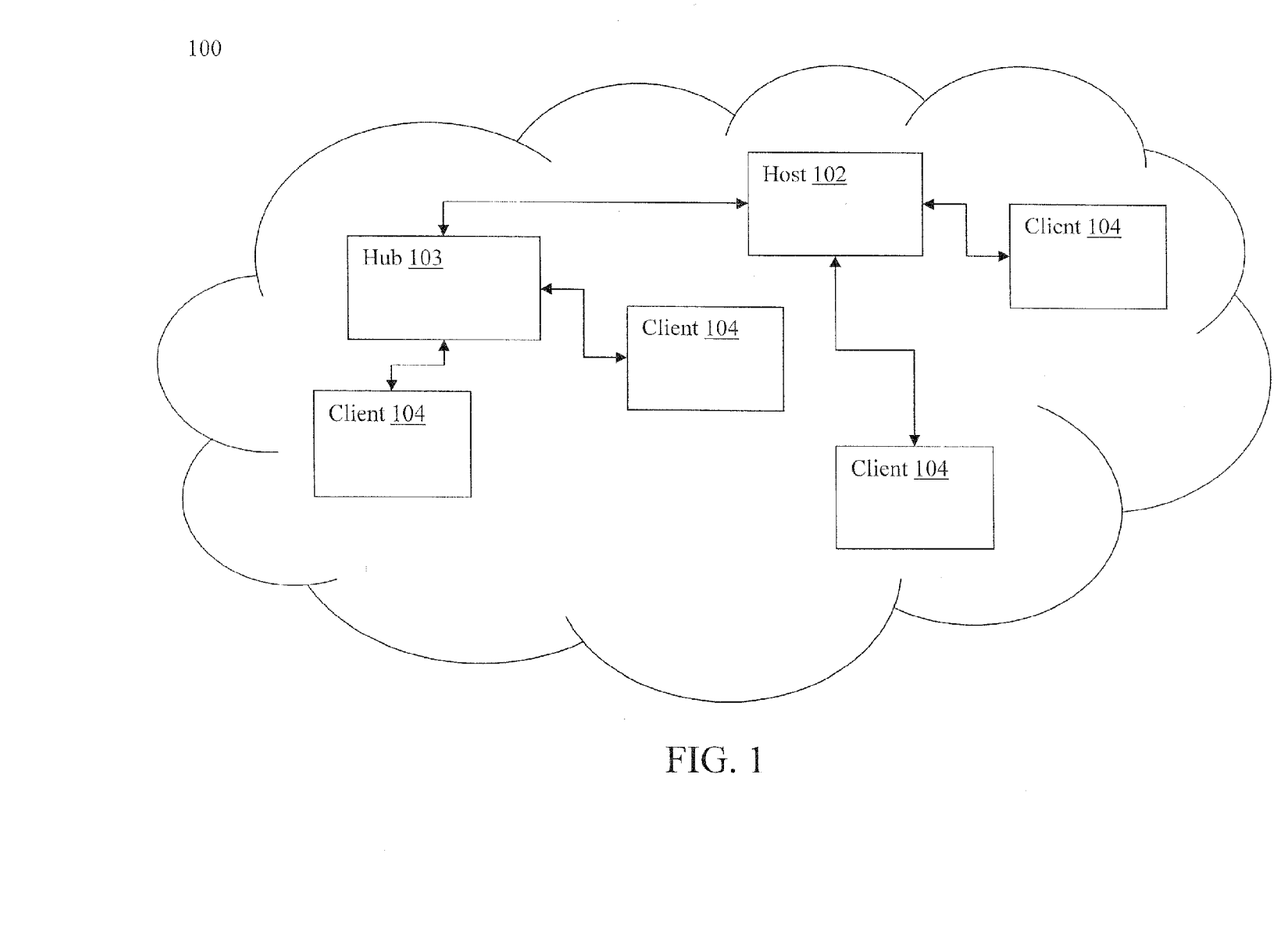
FIG. 1 is a functional block diagram illustrating an exemplary USB serial bus network in accordance with the principles of the present invention.

Referring now to FIG. 1, a multi-device system or network 100 is illustrated. In the illustrated embodiment, the network 100 consists of a host device 102 in communication with four (4) client devices 104 via one or more serial buses and a hub device 103. As used herein, the term "serial bus" refers without limitation to any bus or other data transfer, transmission, receipt, or interface structure adapted to operate according to a serialized protocol. Examples of such serialized protocols include the USB (universal serial bus) protocol, USB 2.0, USB On-The-Go (OTG), USB 3.0, etc. These devices 102, 103, 104 are connected in a so-called tiered-star topology, where the host device reside at a central position and manages communication to various client devices within a given USB network. Host devices are characterized in that they contain a USB Host Controller (HC). Each USB host may have multiple USB Host Controllers (HCs), and each HC may provide one or more USB ports. USB devices are linked in series through hubs.

Host devices and client devices may include, but are not limited to, personal computers (PCs) (whether desktop, laptop, handheld or otherwise), and mobile devices such as smartphones, PDAs, digital and video cameras, personal media devices (PMDs) (such as MP3 players, printers or rendering devices), or any combinations of the foregoing.

USB device communication is based on the use of logical channels known as "pipes". Each pipe forms a connection from the HC to another logical entity known as an endpoint. A USB host device can have up to thirty two (32) endpoints: sixteen (16) endpoints for communication into the HC and sixteen (16) endpoints for communication out of the HC. As previously noted, each USB device is also required to have a default control pipe that is bi-directional nature. USB "stream" pipes are unidirectional and transfer data in using an isochronous, interrupt, or bulk transfer. Message pipes are bi-directional pipes that transfer data using a request/data/status paradigm. The data within message pipes has an imposed structure that allows requests to be reliably identified and communicated.

Prior Art Operation—

Figure 2:
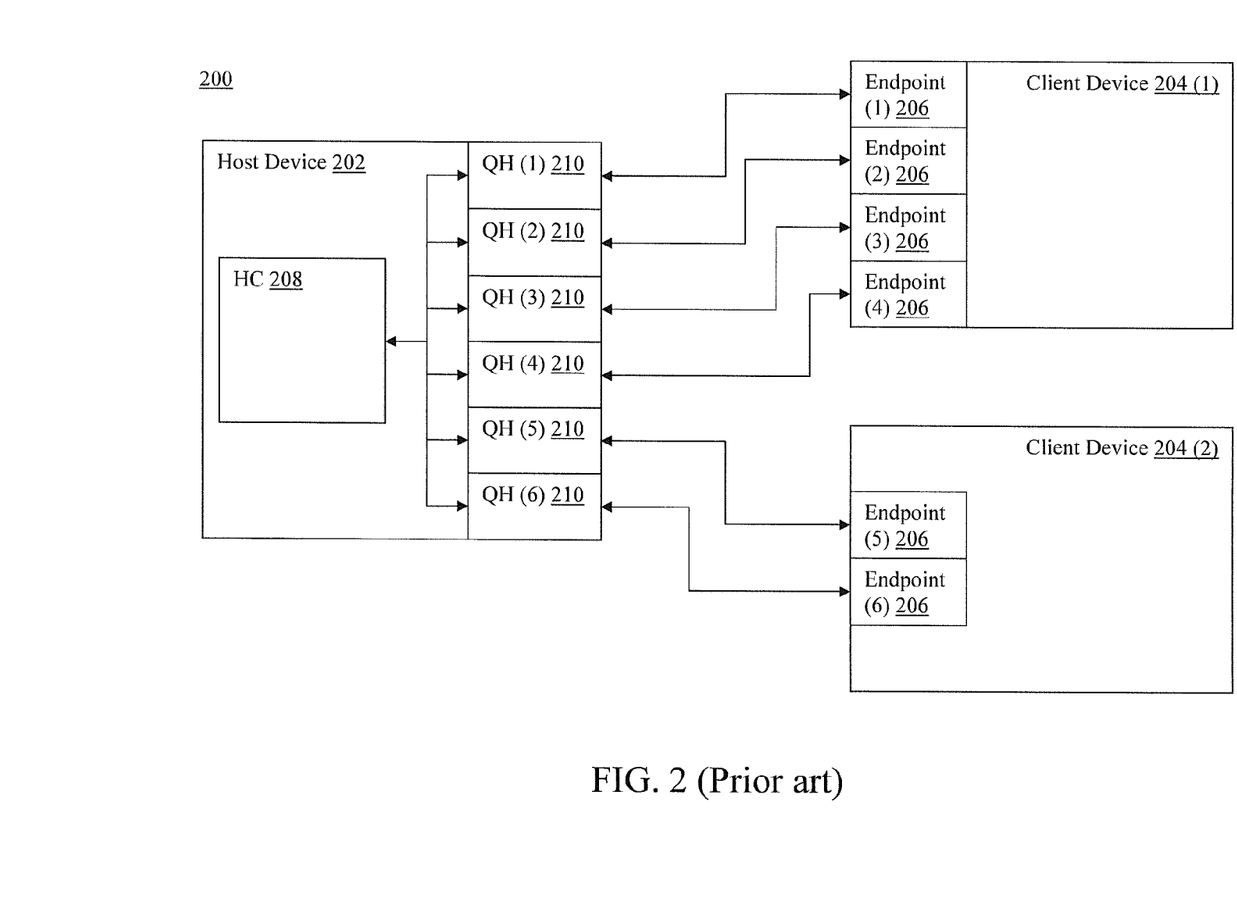
FIG. 2 is a functional block diagram illustrating two client devices in data communication with a host device via a plurality of data pipes according to the prior art.

FIG. 2 illustrates a prior art USB network 200 consisting of a single host device 202 in communication with two (2) client devices 204. The host device illustrated includes an HC 208, which manages communications between endpoints 206. Queue heads (QHs) 210 associated with a given logical pipe describe work to be performed for that pipe. USB Host Controller Driver software (HCD), located on the host device, has the responsibility for managing the work for the USB HC. Upon establishment of a logical connection between endpoints (i.e., the establishment of a pipe), the HCD creates a list of QHs, one for each logical connection. These QHs then describe work to be performed by the HC in managing the transmission of data along the pipes. QHs can either be active (i.e., there is a pending task to be completed), or they can be inactive. The HC manages these pending tasks by examining each QH in a round-robin or other fashion, and determining if there is any work needed to be performed. The use of a round-robin technique for examining each QH is an effort by the HC to be "fair" to all of the QHs the HC must manage.

Figure 3:
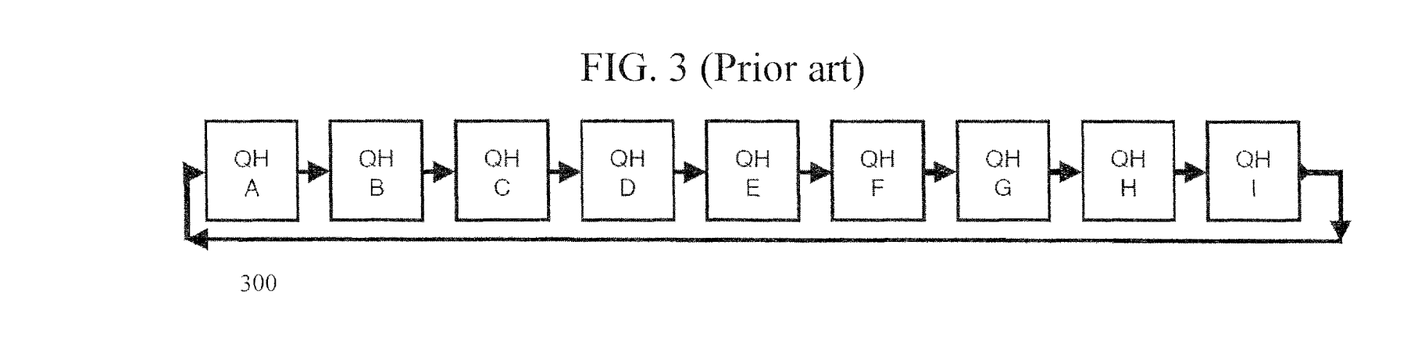
FIG. 3 is a logical block diagram illustrating a prior art queue head polling operation.

Referring now to FIG. 3, one exemplary prior art HC servicing nine (9) QHs is illustrated. Specifically, FIG. 3 illustrates a complete set of QHs 300 (i.e. QH (A) through QH (I)) that are currently being managed by an HC. In the following example, only QH (E) and QH (G) are active. During operation, the HC will examine each of the QHs according to a "round-robin" schedule, as indicated by the arrows. Specifically, each QH is assessed and serviced in circular order.

In this example, the HC will first examine QH (A) and determine that there is no work to be performed. \Next, the HC will examine QH (B) and again determine that no work is to be performed. Similarly, QH (C) and QH (D) are examined and determined that no work is to be performed.

When QH (E) is examined, it is determined that QH (E) requires servicing, and that work is subsequently executed in whole or in part.

After servicing QH (E), the HC will next examine QH (F) (which does not have any work to be performed).

Then the HC inspects QH (G), which also has work that needs to be executed.

After servicing QH (G), QH (H) and QH(I) are examined in order and each is determined not to have any work for execution.

As described supra, examining each of these QHs in memory according to the foregoing scheme takes time, and in cases where a relatively small minority of the QHs are active (such as above), the excess wasted time examining the inactive QHs results in missed work opportunities on the QHs which actually are active. This is especially true where the number of QHs is high, and the fraction of them having actual work to be performed is low. In other words, this causes the actual throughput of QH (E) and QH (G) to be lower then it optimally can be. In addition, examining QHs also results in the device using more energy than necessary in order to support the memory read operations by the HC.

Example Operation—

Figure 4:
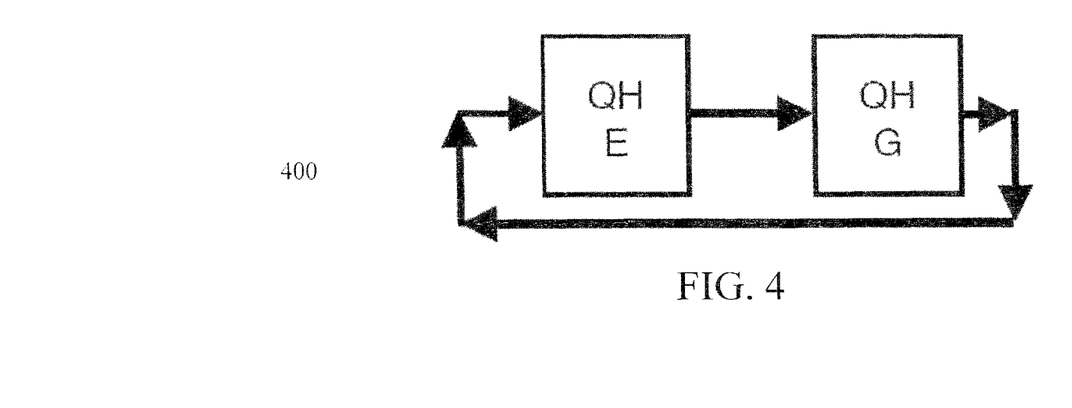
FIG. 4 is a logical block diagram illustrating a queue head polling operation in accordance with the principles of the present invention.

In contrast to the prior art round robin scheme for servicing QHs of FIG. 3, FIG. 4 illustrates the one exemplary scheme for servicing a trimmed set of QHs 400 according to various aspects of the present invention. As shown in FIG. 4, the inactive QHs in the complete set have been removed, and only the active QHs are examined during operation.

As illustrated, the examination cycle time has been significantly reduced. Instead of having to examine each of the nine (9) QHs associated with the HC, the HC only has to examine the two (2) active QHs (i.e. QH (E) and QH (G)). This results in improved throughput for the execution of processes on QH (E) and QH (G), thereby providing an improved experience for users of the USB system. In addition, if these processes were executed on a battery powered device, such as a laptop computer or smartphone or digital camera, a user could expect to achieve improved battery life, as the processor associated with the device could more frequently enter into lower power states if the QHs were more efficiently examined.

Method—

Figure 5:
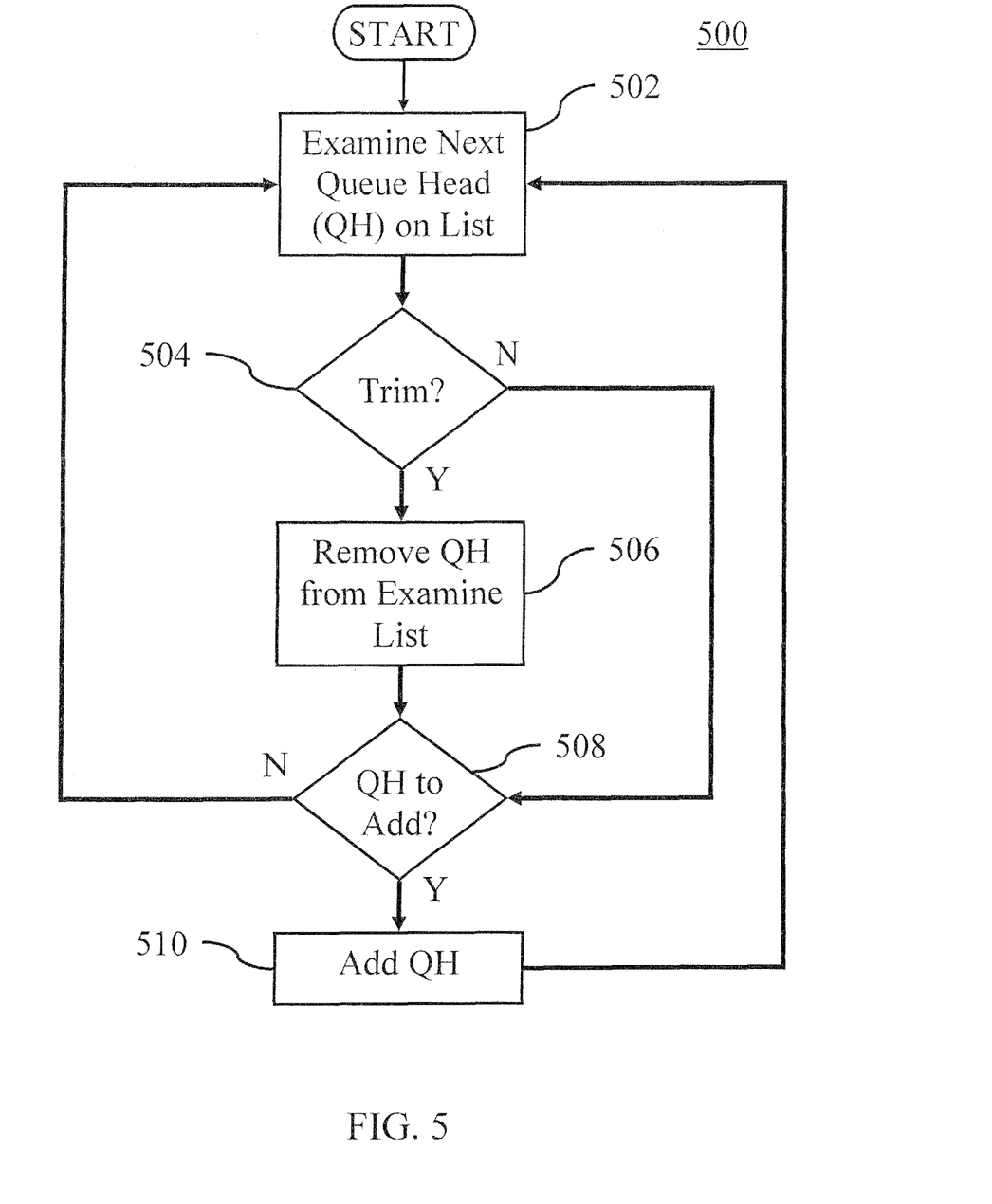
FIG. 5 is a logical flow diagram illustrating a queue head trimming operation in accordance with one embodiment of the present invention.

Referring now to FIG. 5, one embodiment of the method for executing a queue head trimming operation 500 is illustrated. At step 502, the Host Controller Driver (HCD) examines the next QH present within memory. In an exemplary implementation, the order of QH examination is implemented in a round-robin fashion, such that each QH is examined in sequential order. This examination will look at whether or not the examined QH has any work to be performed. It is noted that in the illustrated implementation, the examination is performed in real time; i.e., the examination evaluates whether there is any work to be performed at the time the QH is checked. However, it will be appreciated that the invention is not so limited, and in fact other types of schemes may be used, such as where the information obtained from each examined QH indicates whether there is any work to be performed either at that instant, or in the future (e.g., within a prescribed "look-ahead" temporal or number-of-cycles window). This future information may be generated in any number of different ways, including for example: (i) having another process within the host or peripheral examine an upstream node or process to identify incipient transactions; or (ii) speculative/probabilistic analysis (i.e., "educated guess" based on e.g., historical data or deterministic rules).

In addition, in an exemplary embodiment shown in FIG. 5, the HCD will also look at one or more of the following data fields present within the QH such as: (1) time elapsed since a process was last executed on the examined QH; and (2) priority and/or classification information for the device. This read information is then utilized in the determination process of whether or not the examined QH should be trimmed.

At step 504, the decision to trim the examined QH is made. In one embodiment, this decision is based on information read during the examination process at step 502. In some implementations, the threshold for determining whether or not to trim a QH is based on whether or not any pending tasks are present in the QH. Alternatively, the data field that includes information regarding elapsed time since a task was last executed or examined on the QH will be used as an input to the trim determination process. For example, if the HCD reads the QH (including the elapsed time field) and determines that the last task executed on the QH has not occurred for a pre-determined amount of time (e.g., 5 seconds), and/or number of executions (e.g., no task has executed during the last five (5) examinations of the present QH), then the HCD software will trim this QH from the examination queue for the HC. However, if there is a task scheduled on a QH, whether or not that task has executed, the QH needs to remain active. Tasks which remain unserviced will eventually timeout (eventually removing the task from the QH), which then potentially leaves the QH with no task and thus eligible for trimming at a later time.

In one exemplary embodiment, the selected time and/or number of executions can be determined anecdotally or empirically (e.g., by experimentation, "trial and error", user feedback, or sensitivity analysis), or also by calculation (e.g., probability analysis of historical data), as described in greater detail subsequently herein. In the exemplary embodiment, the time/cycles field is disposed within the QH data structure which is only accessible by the HCD. Each QH is managed independently, so the HCD can flexibly manage parameter on a per QH basis.

In an alternative embodiment, a timer present on the device (e.g. in the HC) loads a value into a data field present on the QH. On subsequent examinations of the QH, and when the value loaded into the data field exceeds a threshold value that is indicative of a substantial period of inactivity, the QH will be trimmed from the examination queue.

At step 506, if the examined QH is to be trimmed, it is removed. Note however that once an examined QH is trimmed, it will still remain available to be used when software requires its use. In one embodiment, the trimmed QH will be maintained on an "inactive" QH list which is not in the shared memory location used those QHs that remain on the active list. In this way, the HC will not examine those QHs that are present on the inactive list. Note also that at step 504, if the QH is not to be trimmed, the method advances to step 508.

In the optimal case for power consumption, all of the QHs are trimmed from the evaluation list, and the list becomes empty. In that case, the HCD software can actually turn off this part of the HC functionality if desired, and the HC does not spend any time or resources (including electrical power) checking to see if there is work to be performed.

It is also noted that various types and numbers of levels of QH classification hierarchy may be used consistent with the invention. For example, one model has two (2) classes or levels of QH classification: (i) active and on the evaluation list; and (ii) available yet not on the evaluation list (i.e., can be activated and put back on the evaluation list, such as via a software request). Other such schemes will be recognized by those of ordinary skill given the present disclosure.

At step 508, it is determined whether or not any QHs currently present on the inactive list, and residing outside of the shared memory space of the active QH, need to be added back to the shared memory space. The addition of such QHs may be due to any number of different circumstances, including for example power-up of a device or instantiation/initialization of a process, or a software call (e.g., data transfer request) for an extant process.

For example, in one exemplary embodiment there are two normal mechanisms for adding a QH back to the shared memory space: (i) externally triggered by stimulus, and (ii) called by software. For example, if an external stimulus occurs on the device, such as a user interaction (touching a device which hasn't been touched in a while, etc.) then the software adds the appropriate QH back onto the active list.

In one implementation, a QH is added in response to a SetConfiguration API request. This causes a Set_Configuration request to the device, which configures the device to have a specific set of endpoints. Then, the QHs corresponding to the endpoints are instantiated on the host side.

It will be recognized that while the foregoing methodology is described in terms of a generally sequential or consecutive series of "round robin" QH examinations (i.e., of those that have not been trimmed at the time of examination), other schemes may be used consistent with the invention. For example, in one other embodiment, the sequence of examination of the individual (then existing) QHs is performed according to a probabilistic or likelihood scheme. In one such implementation, the character or type of each QH is determined, and based on pre-existing rules, the frequency and sequence of examination is adjusted accordingly. For instance, consider the simple example of where three (3) QHs remain after a trimming process (step 506) has been performed. If a first of those QHs (1) is associated with a device or process that is known to be accessed or used at twice the frequency of the second QH (2), and that second QH is accessed or used at twice the frequency of the third QH (3), then, sampling or examination of the QHs will be conducted such that the third QH (3) is evaluated at twice the frequency of the second QH (2), and that second QH is evaluated at twice the frequency of the first, since the likelihood that the third QH (3) will have a "trimming opportunity" is twice as great as that for the second QH (2), and so forth. Such skewed sampling frequency distributions can be conducted according to any number of schemes, including e.g., as follows, which samples or evaluates in the ratio 3:2:1:

1) First iteration—Evaluate QH(1);
2) Second iteration—Evaluate QH(1) and then QH(2);
3) Third iteration—Evaluate QH(1), and then QH(2), and then QH(3); and
4) Repeat first through third iterations.

The character or type of each QH may relate to the type of process or device which is utilizing the QH (i.e., certain types of devices or processes may present more or less opportunities for trimming based on their nature). Alternatively (or in conjunction), a probabilistic or speculative approach may be used, such as where the HC or other entity maintains historical trimming data on various types or categories of QHs/devices, and uses this data to speculate as to future likelihood of use.

In another embodiment, the device deconfiguration or reconfiguration (so that an endpoint no longer exists on the device) can be used as the basis for removal of a QH from the active list.

In yet another embodiment, extrinsic signals or data may be used as the basis of adjusting the evaluation schedule and/or frequency. For instance, where the HC receives a signal or message indicating that a connected device or process has been powered down, terminated, or gone into a sleep state, this information can be used to either reduce the priority of the associated QH (i.e., make it more eligible for trimming), or change its evaluation frequency.

Implementation Considerations

It is noted that the HCD (e.g., software) generally must not trim a QH from the active QH list at a time when it is possible for work to be added to that QH (possibly through another CPU thread or other mechanism). This functionality is achieved in one embodiment of the invention by using a software synchronization "locking" mechanism of type known in the software arts e.g., an OS X (command gate) of the type manufactured by the Assignee hereof. For instance, an exclusive lock may be used, where exclusive (read and write) modes are provided. Locking designs generally block the execution of the thread requesting the lock until it is allowed to access the locked resource. In another variant, a spinlock (i.e., a lock that causes the thread to wait ("spin") until the locked resource becomes available).

In this fashion, the QH cannot be removed by the HCD when locked, and will remain on the list until it is again evaluated and both (i) in an unlocked state, and (ii) identified for trimming by the HCD trimming logic (e.g., for having exceeded the inactivity timeout previously described).

Moreover, the HCD generally must not trim a QH from the list too quickly (i.e., in too short a time, or in too few cycles, etc. depending on the implementation) after the QH has gone "idle". If the HCD were to do so, some upper level software might subsequently request a transfer on that QH, and potentially cause use of more resources (time and electrical energy) by trimming and then re-adding the QH, as compared to the time/energy associated with polling the untrimmed QH. Hence, in one embodiment of the invention, a tunable timer is used, through which the optimal amount of time (or cycles, or other metric) between when a QH goes inactive and when it can be trimmed from the list can be determined. In one implementation, the timer is controlled or tuned automatically by a higher-level software process (e.g., application or middleware) which evaluates one or more metrics of performance of the host controller or host in general (e.g., read latency, write latency, etc.) and selects a timer value based on the evaluation of performance. This may include a sensitivity analysis (e.g., iteratively varying the timer value up and/or down for a period of time, and then observing the change in performance). In another variant, a time constant is used.

In another variant, the user (or technician) is provided with the ability to vary the timer setting so as to attempt to optimize it; e.g., via an installed application tool suite, GUI slider, or the like.

Exemplary test data for various implementations is shown in Appendix A hereto.

Exemplary Apparatus—

Figure 6:
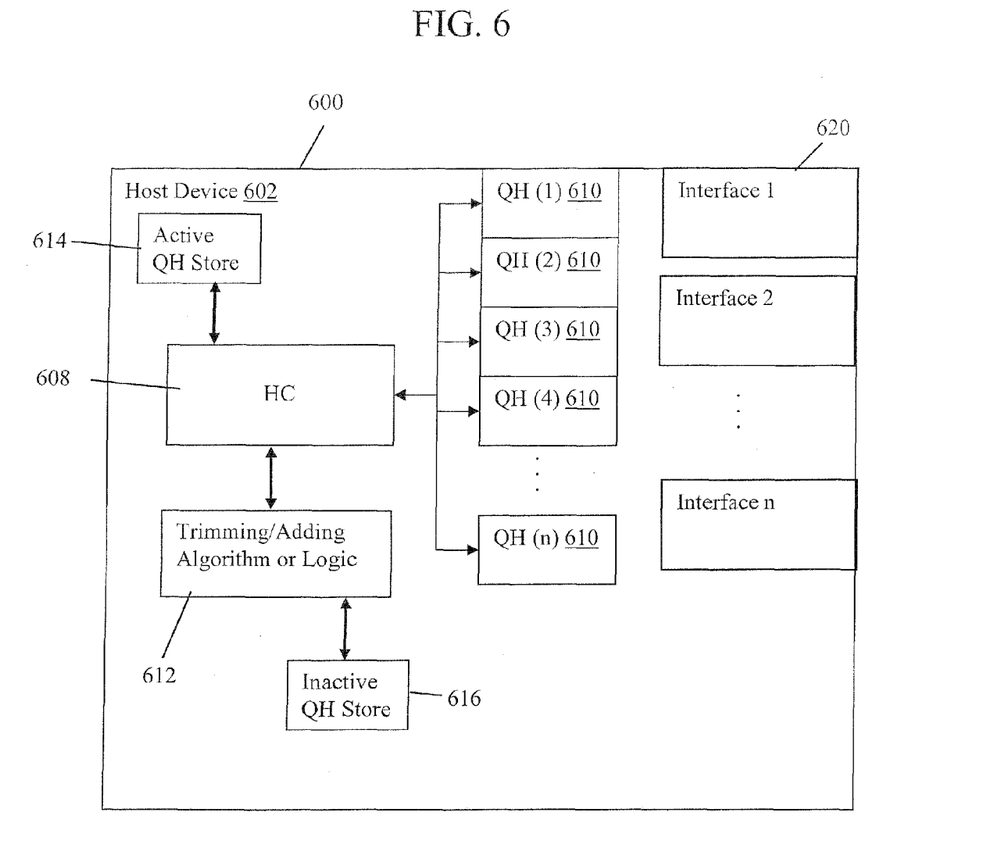
FIG. 6 is a block diagram of an exemplary host apparatus useful for implementing the methods of the present invention.

FIG. 6 illustrates one exemplary embodiment of an apparatus useful for implementing the methods of the present invention. The host device 602 illustrated includes an HC 608, which manages communications between endpoints. As with the architecture of FIG. 2, the queue heads (QHs) 610 associated with a given logical pipe describe work to be performed for that pipe. USB Host Controller Driver software (HCD) or logic 612, located on the host device, has the responsibility for managing the work for the USB HC as well as implementing the QH trimming and re-addition functionality previously described. The HC further includes a state machine (not shown) and locking mechanism(s) for managing the state of various transactions and threads wishing to access the QHs.

The HC 608 is in one embodiment rendered as one or more integrated circuits. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

The illustrated device 600 further includes an active QH store 614 and an inactive QH store 616, which in one embodiment comprise memory of the host. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. Depending on the status of a given QH, it will be disposed in the active or inactive store as previously described The exemplary apparatus of FIG. 6 further includes a processor subsystem (not shown) such as a digital signal processor, microprocessor, field-programmable gate array, or plurality of processing components mounted on one or more substrates. The processing subsystem may also comprise an internal cache memory. The processing subsystem is connected to a memory subsystem comprising memory which may for example, comprise SRAM, Flash and SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment, the device can comprise of one or more wired (e.g., USB) or wireless interfaces 620 adapted to connect to or communicate with one or more other devices (e.g., clients 204). The QHs 610 may be mapped to the interfaces (i) where a single QH is mapped to a single interface, (ii) where multiple QHs are serviced by the same interface, or (iii) where one QH is associated with multiple interfaces. However, a QH is generally assigned to only one interface (with the possible exception of the default control endpoint), but an interface may have multiple QHs.

The device may also include a user interface subsystem that includes any number of well-known I/O including, without limitation: a keypad, touch screen (e.g., multi-touch interface), LCD display, backlight, speaker, and/or microphone. However, it is recognized that in certain applications, one or more of these components may be obviated.

It will be appreciated that while FIG. 6 illustrates a host device (e.g., a USB host), the methodologies of the present invention may be practiced in other devices as well, including without limitation the client devices 204 of FIG. 2. For example, in one variant, the HC 608 can be configured to distribute to, or utilize at least portions of the evaluation/trimming logic disposed on, one or more of the client devices. In one such implementation, the client includes logic (e.g., hard-coded logic or software) which can perform at least a portion of the evaluation processing and trimming/adding functions previously described. For example, a client may issue a "pending activity" signal or message to the HC of the host, alerting it to impending activity on a given pipe (and hence its associated QH).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX A

© Copyright 2010 Apple Inc. All rights reserved

Test setup comprised a USB hard drive, plugged into the appropriate slot of the machine. Tests comprised execution of the program QuickBench to measure the speed, using the extended sequential read/write tests.

Machine A is a MacBook 13" Late (circa 2006)
Machine B is a MacBook Pro 17-inch (circa 2010)
Machine C is a MacBook that was never shipped (prototype)

| Machine Type | Read Gains | Write Gains | Comments |
|---|---|---|---|
| Machine A | — | 0.5% | Read Difference is not significant |
| Machine B Middle Port | 4% | 7% | |
| Machine B Front Port | 14.5% | 30% | |
| Machine C Back Port | — | 6.4% | Read Difference is not significant |
| Machine C Front Port | — | 3.1% | |

Raw Numbers:

| | Read (MByte/s) | | Write (MByte/s) | |
|---|---|---|---|---|
| Machine Type | Before | After | Before | After |
| Machine A | 36.9 | 37.0 ±0.3 | 26.7 | 26.9 ±0.5 |
| Machine B Middle Port | 31.5 | 35.4 ±0.4 | 25.7 | 27.5 ±0.5 |
| Machine B Front Port | 24.7 | 35.4 ±0.7 | 19.2 | 27.5 ±0.2 |
| Machine C Back Port | 36.9 | 36.8 ±0.9 | 28.8 | 30.8 ±0.7 |
| Machine C Front Port | 37.0 | 36.8 ±0.4 | 29.8 | 30.8 ±0.7 |

What is claimed is:

1. A method of managing a plurality of queues of processes associated with a plurality of devices on a serialized bus, the method comprising:
   monitoring the plurality of queues to determine if any of the monitored queues meet an inactivity criterion, where the inactivity criterion comprises an indication as to whether there will be work to be performed on the queue in the future;
   when any of the monitored queues meets the inactivity criterion, trimming the queue or queues from the plurality; and
   after the trimming, monitoring only the untrimmed queues.

2. The method of claim 1, wherein the monitoring is performed by a controller in a host device, and the processes are in data communication with the host device.

3. The method of claim 2, wherein the data communication comprises communication over a wired link.

4. The method of claim 2, wherein the data communication comprises communication over a wireless link.

5. The method of claim 1, wherein the inactivity criterion additionally comprises an indication that no activity has occurred during a prescribed period of time since a last monitoring for that queue.

6. The method of claim 1, wherein the inactivity criterion additionally comprises an indication that no activity has occurred for a prescribed number of monitoring events for that queue.

7. The method of claim 1, further comprising identifying one or more queues from the plurality for monitoring based at least in part on one or more queue types.

8. The method of claim 7, wherein the one or more queue types are associated with respective device types.

9. The method of claim 8, wherein at least a first queue type is associated with a hub device, and a second queue type is associated with a client device.

10. A method of reducing resource consumption when monitoring a data bus, the method comprising:
   monitoring a first set of client processes for activity, the client processes associated with client devices of the data bus;
   identifying one or more of the client processes which are inactive and one or more of the client processes which are active, the identifying based on an indication as to whether there will be work to be performed on client process in the future;
   trimming the identified inactive client processes for at least a period of time; and
   after the trimming, monitoring only the untrimmed client processes for the period of time.

11. The method of claim 10, wherein the monitoring is performed by a controller in a host device, and the client devices are in data communication with the host device.

12. The method of claim 11, wherein the data communication comprises communication over a wired link.

13. The method of claim 11, wherein the data communication comprises communication over a wireless link.

14. The method of claim 11, wherein the identifying one or more client processes is additionally based at least in part on one or more client device types.

15. The method of claim 11, wherein at least a first client device type is a hub type device, and a second client device type is a client type device.

16. A host apparatus useful configured to reduce resource consumption when monitoring a data bus, the host apparatus comprising:
   a plurality of interfaces, each one of the plurality of interfaces associated with one or more queues that are in turn associated with one or more client processes, the one or more queues also being associated with a respective client device;
   a processor; and
   a computer readable apparatus having a storage medium with at least one computer program stored thereon, the at least one computer program configured to, when executed on the processor, cause the processor to:
      monitor the plurality of queues to determine if any of the monitored queues meet an inactivity criterion, where the inactivity criterion includes an indication as to whether there will be work to be performed on the queue in the future;
      when any of the monitored queues meets the inactivity criterion, trim the queue or queues from the plurality; and
      thereafter, monitor only the untrimmed queues.

17. The host apparatus of claim 16, wherein inactive queues are added back to the plurality of queues based at least in part on at least one external stimulus.

18. The host apparatus of claim 16, wherein inactive processes are added back to the plurality of queues based at least in part on a software request.

19. The host apparatus of claim 16, wherein the indication as to whether there will be any work to be performed on the queue in the future is based at least in part on a "look-ahead" window.

20. The host apparatus of claim 16, wherein the indication as to whether there will be any work to be performed on the queue in the future is based at least in part on a incipient transactions.

21. The host apparatus of claim 16, wherein the indication as to whether there will be any work to be performed on the queue in the future is based at least in part on historical data.

* * * * *